United States Patent
Allen et al.

(10) Patent No.: US 12,536,203 B2
(45) Date of Patent: Jan. 27, 2026

(54) VARIABLE DENSITY-BASED CLUSTERING ON DATA STREAMS

(71) Applicant: Capital One Services, LLC, McLean, VA (US)

(72) Inventors: Thomas Allen, Gainesville, FL (US); Milind Patel, Frisco, TX (US); James Howe, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 100 days.

(21) Appl. No.: 18/301,537

(22) Filed: Apr. 17, 2023

(65) Prior Publication Data

US 2023/0252055 A1 Aug. 10, 2023

Related U.S. Application Data

(63) Continuation of application No. 17/444,395, filed on Aug. 4, 2021, now Pat. No. 11,630,855.

(51) Int. Cl.
*G06F 16/2455* (2019.01)
*G06F 16/28* (2019.01)

(52) U.S. Cl.
CPC ...... *G06F 16/287* (2019.01); *G06F 16/24568* (2019.01)

(58) Field of Classification Search
CPC . G06F 16/24568; G06F 16/285; G06F 16/287
See application file for complete search history.

(56) References Cited

U.S. PATENT DOCUMENTS

| | | | |
|---|---|---|---|
| 9,465,857 B1 | 10/2016 | DeLand et al. | |
| 11,080,307 B1 | 8/2021 | Holub et al. | |
| 11,226,992 B1 * | 1/2022 | Ramsey | G06F 16/285 |
| 11,294,936 B1 | 4/2022 | Jaureguiberry | |
| 11,630,855 B2 | 4/2023 | Allen et al. | |

(Continued)

OTHER PUBLICATIONS

Ester M., et al., "A Density-Based Algorithm for Discovering Clusters in Large Spatial Databases with Noise," KDD-96 Proceedings, Aug. 1996, pp. 226-231.

(Continued)

*Primary Examiner* — Apu M Mofiz
*Assistant Examiner* — J Mitchell Curran
(74) *Attorney, Agent, or Firm* — Harrity & Harrity, LLP

(57) ABSTRACT

In some implementations, a device may receive, from a data stream, a set of data points arranged in a dimensional data space. The device may compare the set of data points to identify one or more clusters using values of a distance parameter for data points included in the set of data points, wherein the values of distance parameter includes different values of the distance parameter for different data points. The device may transmit an indication of the one or more clusters to cause a device to display information associated with the one or more clusters. The device may receive, from the device, feedback information associated with at least one data point, wherein the feedback information indicates that at least one data point is associated with an error. The device may modify a value of the distance parameter associated with the at least one data point to a modified value.

20 Claims, 7 Drawing Sheets

(56) References Cited

U.S. PATENT DOCUMENTS

2012/0296905 A1* 11/2012 Tsai .................. G06F 16/285
707/E17.089
2013/0124525 A1   5/2013 Anderson et al.
2021/0365823 A1  11/2021 Dong et al.

OTHER PUBLICATIONS

Feng C., et al., "Density-Based Clustering Over an Evolving Data Stream with Noise," Proceedings of the Sixth SIAM International Conference on Data Mining, pp. 1-12.
Lloyd S.P., "Least Squares Quantization in PCM," IEEE Transactions On Information Theory, Mar. 1982, vol. IT-28 (2), pp. 1-9.

* cited by examiner

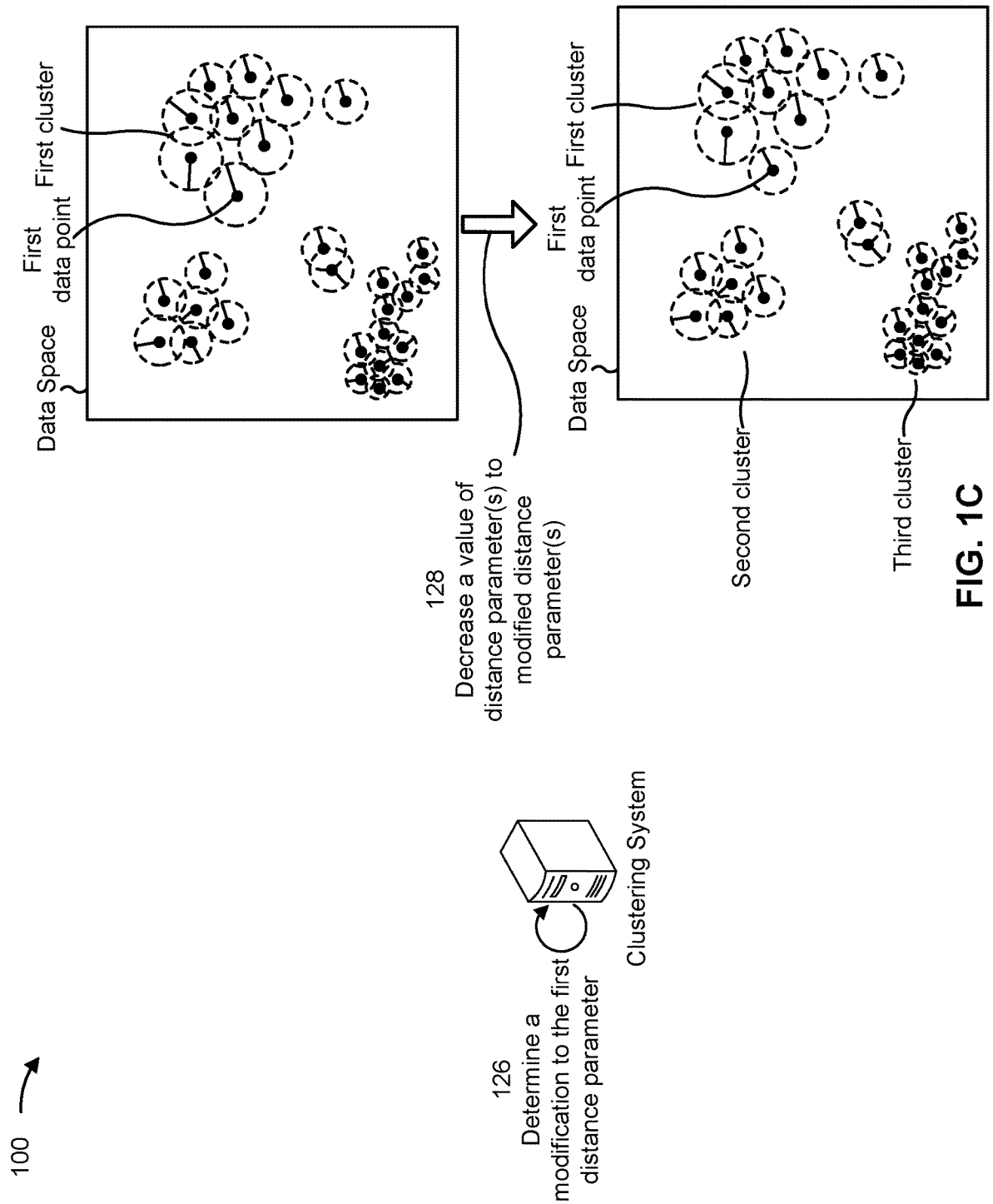

400 ⟶

410 — Receive, from a data stream, a set of data points arranged in a dimensional data space 420 — Compare the set of data points to identify one or more clusters using values of a distance parameter for data points included in the set of data points, wherein the values of the distance parameter includes different values of the distance parameter for different data points, and wherein comparing the set of data points includes comparing a first data point and a second data point from the set of data point using a first value of the distance parameter, associated with the first data points, and a second value of the distance parameter associated with the second data point 430 — Transmit, to a client device, an indication of the one or more clusters to cause the client device to display information associated with the one or more clusters 440 — Receive, from the client device, feedback information associated with at least one data point, wherein the feedback information indicates that the at least one data point is associated with an error 450 — Modify a value of the distance parameter associated with the at least one data point to a modified value of the distance parameter, based on the feedback information

FIG. 4

VARIABLE DENSITY-BASED CLUSTERING ON DATA STREAMS

RELATED APPLICATION

This application is a continuation of U.S. patent application Ser. No. 17/444,395, filed Aug. 4, 2021 (now U.S. Pat. No. 11,630,855), which is incorporated herein by reference in its entirety.

BACKGROUND

Cluster analysis or clustering is the task of grouping a set of objects (e.g., data points) in such a way that objects in the same group (e.g., a cluster) are more similar (in some sense) to each other than to objects in other groups (e.g., other clusters). Cluster analysis or clustering may be used for exploratory data analysis, statistical data analysis, pattern recognition, image analysis, information retrieval, bioinformatics, data compression, computer graphics and/or machine learning, among other examples.

SUMMARY

Some implementations described herein relate to a system for variable density-based clustering on data streams. The system may include one or more memories and one or more processors coupled to the one or more memories. The one or more processors may be configured to receive, from a data stream, a set of data points arranged in a dimensional data space. The one or more processors may be configured to analyze the set of data points to identify one or more clusters from the set of data points, wherein analyzing the set of data points includes: comparing a first data point and a second data point from the set of data points; determining if a distance between the first data point and the second data point, in the dimensional data space, satisfies a value of the distance parameter; and correlating the first data point and the second data point in a first cluster if the distance between the first data point and the second data point satisfies the value of the distance parameter, and wherein the value of the distance parameter is specific to at least one of the first data point, the second data point, and wherein analyzing the set of data points includes analyzing the set of data points using different values for the distance parameter for different data points. The one or more processors may be configured to transmit, to a client device, an indication of the one or more clusters. The one or more processors may be configured to receive, from the client device, feedback information associated with at least one data point, wherein the feedback information indicates that the at least one data point is not correctly clustered. The one or more processors may be configured to modify a value of the distance parameter associated with the at least one data point, based on the feedback information, to a modified value of the distance parameter.

Some implementations described herein relate to a method for variable density-based clustering. The method may include receiving, by a device and from a data stream, a set of data points arranged in a dimensional data space. The method may include comparing, by the device, the set of data points to identify one or more clusters using values of a distance parameter for data points included in the set of data points, wherein the values of the distance parameter includes different values of the distance parameter for different data points, and wherein comparing the set of data points includes comparing a first data point and a second data point from the set of data points using a first value for the distance parameter, associated with the first data point, and a second value for the distance parameter associated with the second data point. The method may include transmitting, by the device and to a client device, an indication of the one or more clusters to cause the client device to display information associated with the one or more clusters. The method may include receiving, by the device and from the client device, feedback information associated with at least one data point, wherein the feedback information indicates that the at least one data point is associated with an error. The method may include modifying, by the device, a value of the distance parameter associated with the at least one data point to a modified value of the distance parameter, based on the feedback information.

Some implementations described herein relate to a non-transitory computer-readable medium that stores a set of instructions for a device. The set of instructions, when executed by one or more processors of the device, may cause the device to receive, from a data stream, a set of data points arranged in a dimensional data space. The set of instructions, when executed by the one or more processors of the device, may cause the device to analyze the set of data points to identify one or more clusters from the set of data points, wherein analyzing the set of data points includes: comparing a first data point and a second data point from the set of data points using a first value of a distance parameter associated with the first data point and a second value of the distance parameter for the second data point, and correlating the first data point and the second data point in a first cluster if a first radius, defined by the first value, intersects with a second radius defined by the second value, and wherein analyzing the set of data points includes analyzing the set of data points using different values of the distance parameter for different data points. The set of instructions, when executed by the one or more processors of the device, may cause the device to determine a modification to a value of the distance parameter for at least one data point, based on the at least one data point being associated with an error, to obtain a modified value of the distance parameter. The set of instructions, when executed by the one or more processors of the device, may cause the device to analyze a new data point, from the data stream, to determine if the new data point should be included in a cluster with the at least one data point using the modified value of the distance parameter.

BRIEF DESCRIPTION OF THE DRAWINGS

FIGS. 1A-1D are diagrams of an example implementation relating to variable density-based clustering on data streams.

FIG. 4 is a flowchart of an example process relating to variable density-based clustering on data streams.

DETAILED DESCRIPTION

Figure 1A:
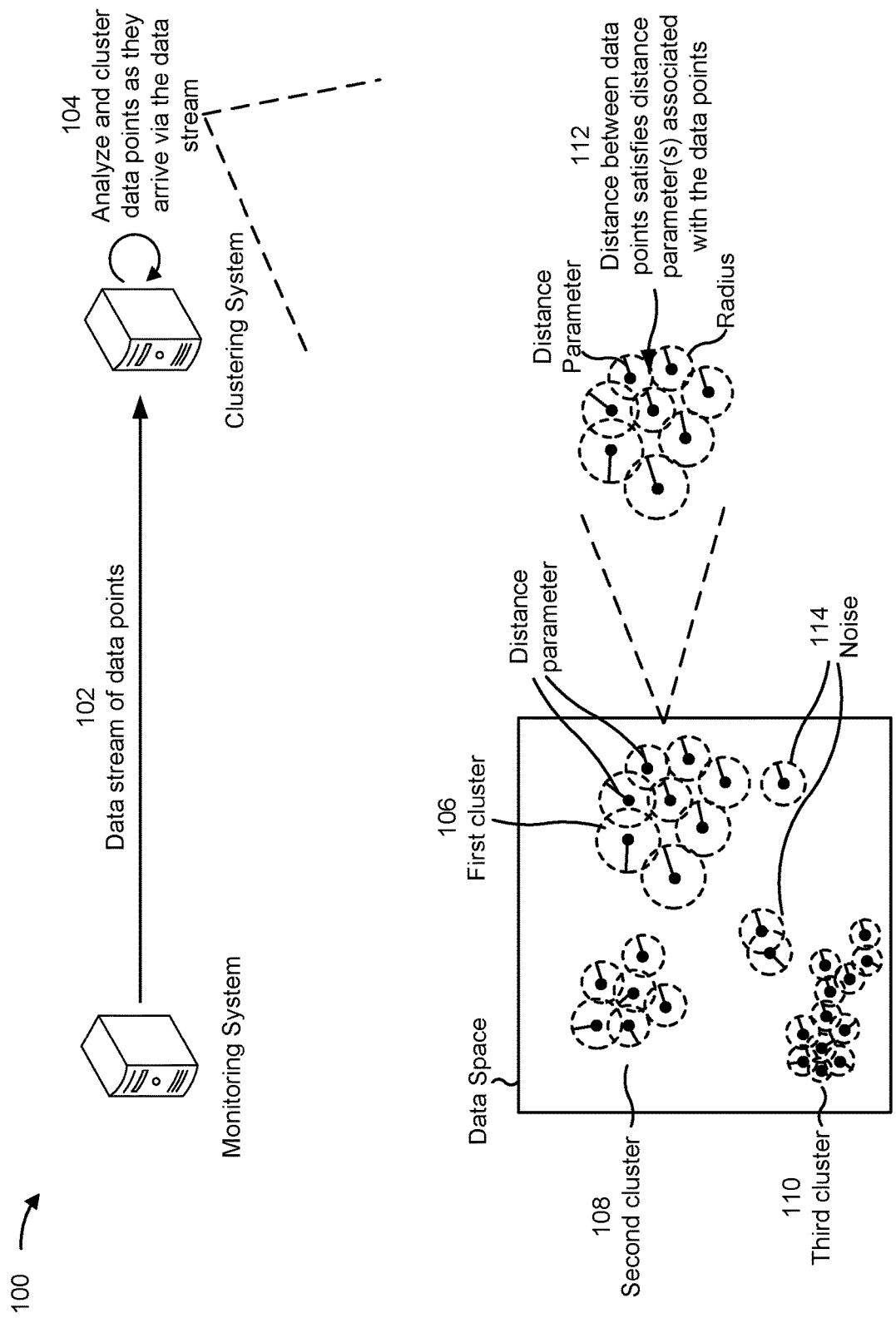

The following detailed description of example implementations refers to the accompanying drawings. The same reference numbers in different drawings may identify the same or similar elements.

Entities often use many different applications or programs, executing on devices associated with the entity, to perform different tasks associated with the entity. These applications and programs generate many (e.g., hundreds, thousands, and/or millions of) data points (e.g., daily, weekly, and/or monthly). The data points may arrive in a continuous data stream (e.g., rather than at discrete intervals). For example, a monitoring system associated with the entity may monitor for alerts from applications and/or programs executing on devices associated with the entity. The alerts may indicate issues, problems, and/or other notifications of items to be addressed by a user. The alerts may recurrently arrive as part of a data stream. Because of the large amount of data points (e.g., the large number of alerts) generated by the monitoring system, there is a significant overhead (e.g., processing overhead, memory overhead, and/or time overhead) associated with identifying the data points, analyzing the data points, and/or determining actions to be performed based on the data points.

In some cases, processing the data may be improved using a clustering analysis technique or a data clustering technique. Clustering may enable data points, distributed in a data space (e.g., a dimensional data space), to be clustered and/or grouped. Clustering analysis is an unsupervised learning method that separates data points in a dimensional space into several specific clusters or groups, such that the data points in the same clusters have similar properties or characteristics and data points in different groups have different properties or characteristics (e.g., in at least one way). Clustering may be an example of unsupervised learning, where a device is enabled to cluster or group unlabeled data points (e.g., data points without defined categories or groups) without user input. Different clustering techniques may be used, such as centroid-based clustering, distribution-based clustering, and/or density-based clustering, among other examples.

Centroid-based clustering is an iterative clustering technique in which clusters are formed based on a closeness of data points to a centroid (or a center point) of a cluster. One example of centroid-based clustering is a k-means clustering technique. In a k-means clustering technique, a data set may be partitioned into K vector spaces (e.g., K clusters). The number assigned for K must be input for the k-means clustering technique. The k-means clustering technique uses iterative refinement to group the data points into the K clusters. For example, an initial estimate for a centroid of each cluster may be used. Each data point in the data set may be assigned to a cluster based on a Euclidean distance to a nearest centroid. The locations of the centroids are then updated based on taking the mean of all data points assigned to a given centroid's cluster. The k-means clustering technique continues to assign data points to clusters and update centroid locations until a stopping criterion is met (e.g., no data points change clusters, the sum of the distances is minimized, or some maximum number of iterations is reached). However, centroid-based clustering (and/or k-means clustering) may be unable to handle data arriving in a data stream (e.g., the newly added data points may result in the stopping criteria not being met). As the k-means clustering technique considers all data points in a cluster (e.g., when calculating the mean for a cluster), a slight change in a data point or a newly added data point may change the clustering results. In other words, centroid-based clustering may assume a static data set. Moreover, a number of clusters formed via centroid-based clustering is fixed (e.g., a number assigned for K must be input and is fixed until updated by a user). Therefore, the centroid-based clustering may be unable to adapt as new or additional clusters are formed within an evolving data set.

A density-based clustering technique may use a distance (e.g., a Euclidean distance) between data points within a data set to form clusters within the data set. For example, a density-based clustering technique may analyze, for a given data point, a distance between the data point and the nearest data points to the data point to determine if the data point and the nearest data points should be grouped or clustered together. An example of a density-based clustering technique is a density-based spatial clustering of applications with noise (DBSCAN) clustering technique. The DBSCAN clustering technique uses two main parameters: a first parameter indicating a minimum number of data points to form a dense region, and a second parameter indicating a threshold distance between data points for the data points to be included in the same cluster (e.g., the second parameter is often referred to as ε or epsilon (eps)). For example, the DBSCAN clustering technique may analyze the data set by determining if there are the minimum number of data points within the threshold distance from a data point. If there are the minimum number of data points within the threshold distance from the data point, then the data points are grouped together and a cluster is formed. The cluster may be expanded by recursively repeating this calculation for data points on the edge of the cluster. As a result, the DBSCAN clustering technique may be capable of identifying data points that should be classified as noise (e.g., data points that do not belong to any cluster), such as when the data point is not within the threshold distance from any other data point. However, the DBSCAN clustering technique may be unable to handle clusters that have varying spacing between data points (e.g., data sets that have different clusters with different densities). For example, if a data set has a first cluster with an average distance between data points of 5 units (e.g., units of a distance measurement) and a second cluster with an average distance between data points of 10 units, and if the second parameter (e.g., ε or eps) is set to a value of 6 units, then the DBSCAN clustering technique may correctly form the first cluster, but may not form the second cluster (e.g., even if the second cluster should be formed based on the properties or characteristics of the data points included in the second cluster). Additionally, if the second parameter (e.g., ε or eps) is set to a value of 11 units, then the DBSCAN clustering technique may correctly form the second cluster. However, the DBSCAN clustering technique may then include data points in the first cluster that should not be included in the first cluster (e.g., because the second parameter is now larger and may result in data points that should actually be classified as noise being included in the first cluster that has a higher density).

Additionally, centroid-based clustering techniques and density-based clustering techniques may only rely on spatial clustering. For example, these clustering techniques may form clusters based on the spatial distance between data points within a dimensional space. However, with an evolving data stream of data points, some data points may be newer (e.g., have arrived in the data set more recently in time) and some data points may be older (e.g., have arrived in the data set less recently in time). Treating newer data points and older data points with the same weight may result in older data points (e.g., that may have become less relevant or impactful to the data set as a whole) disproportionality impacting the clustering results. As a result, the centroid-based clustering techniques and density-based clustering techniques may provide inaccurate clustering results due to relying only on spatial clustering.

The problems described above may cause the clustering analysis to provide inaccurate or inefficient analysis of data points associated with a data stream. As a result, resources (e.g., processing resources, memory resources, and/or time resources) associated with identifying data points, analyzing the data points, and/or determining actions to be performed based on the data points may be increased due to the inaccurate or inefficient analysis of data points associated with the data stream. For example, a mean time to restore for critical issues or high priority issues identified in the data points may be increased due to the inaccurate or inefficient analysis of data points associated with the data stream.

Some techniques described herein may enable variable density-based clustering on data streams. For example, some techniques described herein may enable a clustering system to form different clusters that have different densities. The clustering system may use a distance parameter or a distance threshold between data points to determine if the data points should be clustered together. In some implementations, different data points may use different values of the distance parameter or distance threshold. For example, if the clustering system determines that a first cluster does not include a data point that should be included in the first cluster (e.g., when using a first value of the distance parameter to analyze the data point), then the clustering system may increase the first value such that a distance between the data point and a nearest data point associated with the first cluster is within the increased first value of the distance parameter (e.g., such that the data point will now be included in the first cluster). The clustering system may continue to analyze new data points to determine if the new data points should be included in the first cluster using the increased first value of the distance parameter when analyzing the data point and new data points (e.g., by determining if a distance between a new data point and the data point associated with the first cluster satisfies the increased first value of the distance parameter).

As another example, if the clustering system determines that a second cluster includes a data point that should not be included in the second cluster (e.g., when using a second value of the distance parameter to analyze the data point associated with the second cluster), then the clustering system may decrease the second value of the distance parameter such that a distance between the data point and a nearest data point associated with the second cluster is not within the decreased value of the distance parameter. As a result, the clustering system may be enabled to dynamically adapt to varying densities of clusters within the data set. This may enable the clustering system to improve an accuracy associated with performing clustering analysis of data points associated with a data stream, as recurrently arriving data points may cause the densities of different clusters to change over time and the clustering system may be enabled to dynamically adapt to the changing cluster densities.

In some implementations, the clustering system may utilize user feedback to dynamically adjust the values of the distance parameter used for a given data point or cluster. For example, the clustering system may use a semi-supervised approach for clustering data points associated with the data stream. For example, the clustering system may be enabled to perform clustering analysis of the data points associated with the data stream in an unsupervised manner, as described elsewhere herein. However, the clustering system may also rely on user feedback to determine when a formed cluster is incorrect (e.g., when a formed cluster includes a data point that should not be included in the formed cluster or when the formed cluster does not include a data point that should be included in the formed cluster). For example, the user feedback may indicate that two data points have been incorrectly analyzed by the clustering system (e.g., the two data points may have been incorrectly clustered together or may have incorrectly not been clustered together). The clustering system may modify a value of the distance parameter associated with one (or both) of the data points. As a result, the user feedback may improve the cluster analysis by enabling the clustering system to determine when a formed cluster is incorrect. This enables the clustering system to dynamically adapt values for the distance parameter used for given data points and/or clusters. As a result, an accuracy and efficiency of the cluster analysis may be improved because the clustering system is enabled to form clusters having varying and/or changing densities.

In some implementations, the clustering system may remove clusters and/or data points from the data set based on an amount of time since the clusters and/or data points were added and/or updated in the data set. For example, the clustering system may identify an amount of time since a data point has been added to a cluster. If the amount of time satisfies a time threshold (e.g., that may be set via user input), then the clustering system may remove the cluster from the data set and/or the data space. For example, the clustering system may remove the cluster (and/or associated data points) from a memory of the clustering system such that the cluster (and/or the associated data points) does not impact future clustering analysis performed by the clustering system. The clustering system may store the cluster (and/or the associated data points) in a database or data store to enable the clustering system to access the cluster (and/or the associated data points) if needed. As a result, the cluster (e.g., that may no longer be relevant and/or applicable to the data set) may not impact clustering analysis performed by the clustering system. This enables the clustering system to perform improved clustering analysis for data points associated with a data stream because the data stream may include old data points (e.g., data points that should no longer impact the clustering analysis) and the clustering system may be enabled to disregard or remove the old data points. Moreover, this conserves memory resources of the clustering system because the data stream may recurrently add new data points to the data set, which results in a significant memory overhead for the clustering system. Removing the old clusters and/or data points conserves memory resources that would have otherwise been used by the clustering system to store the old clusters and/or data points (e.g., that may no longer impact the clustering analysis performed by the clustering system).

As a result, the clustering system may be enabled to perform clustering analysis with an improved accuracy and efficiency. For example, by using different values of the distance parameter for different data points within a data set, the clustering system may be enabled to form clusters with varying or changing densities over time. This improves the clustering accuracy of data points associated with a data stream because clusters associated with the data stream may have a varying density over time due to new data points added to the data set via the data stream. Improving the accuracy of the clustering analysis conserves resources (e.g., processing resources, memory resources, and/or time resources) that would have otherwise been used identifying data points, analyzing the data points, and/or determining actions to be performed based on the data points (e.g., because data points clustered together may be associated with the same action), among other examples. For example, a mean time to restore for critical issues or high priority issues identified in the data points may be decreased due to the improved clustering analysis.

FIGS. 1A-1D are diagrams of an example 100 associated with variable density-based clustering on data streams. As shown in FIGS. 1A-1D, example 100 includes a monitoring system, a clustering system, a data storage device, and a client device. These devices are described in more detail in connection with FIGS. 2 and 3.

As shown in FIG. 1A, the monitoring system may receive and/or generate data points. The data points may be associated with applications and/or programs executing on devices (not shown in FIG. 1A) associated with an entity that is associated with the monitoring system and/or the clustering system. For example, an application or program may transmit, to the monitoring system, a data point. The data point may be associated with an alert or other notification generated by the application and/or the program. For example, the data point may be associated with an alert indicating an issue or problem associated with the application and/or the program. Although examples herein may describe the data points as being associated with applications, programs, alerts, and/or notifications, among other examples, the data points may be any data points. For example, techniques described herein may be similarly applied to any data points associated with a data stream.

As shown by reference number 102, the monitoring system may transmit, and the clustering system may receive, a data stream. The data stream may be associated with a set of data points (e.g., a set of recurrently arriving data points). For example, as the monitoring system receives a data point, the monitoring device may add the data point to the data stream. In some implementations, rather than the monitoring system adding data points to the data stream, another device (e.g., a device that generates the data point) or a group of devices may add data points to the data stream. The clustering system may recurrently receive data points, via the data stream, over time.

The data points may be arranged in a data space. The data space may be a dimensional data space. For example, the data points may be arranged in accordance with a dimension of the data points. As used herein, "dimension" may refer to an attribute, a variable, and/or a parameter, among other examples, associated with a data point. For example, the data points may be arranged in a data space in accordance with one or more parameters of the data points (e.g., such that data points that are similar in at least one dimension are located closer together in the data space). For example, the data space may be an n-dimensional data space (e.g., defined by n dimensions). As an example, a data point may represent a person, which contains the person's name (first dimension), height (second dimension), age (third dimension), and weight (fourth dimension). In such examples the value of N is four. Therefore, the data point would occupy a 4-dimensional data space. As shown in FIG. 1A, the data points may be dimensionally arranged within the data space. As new data points are received by the clustering system, via the data stream, the clustering system may add the new data points to the data space (e.g., based on one or more dimensions associated with the new data points).

As shown by reference number 104, the clustering system may analyze the set of data points included in the data space. The data points included in the data space at a given time may define a data set. The clustering system may analyze the set of data points to identify one or more clusters from the set of data points (e.g., to identify one or more clusters within the data set). For example, the clustering system may analyze the set of data points using a distance parameter. The distance parameter may define a distance (e.g., a maximum distance) between two data points for the two data points to be included in the same cluster. The distance parameter may also be referred to as a distance threshold. In some implementations, the distance parameter may define a radius (e.g., around a given data point). For example, if two radii of data points intersect, then the clustering system may determine that the data points may be included in the same cluster (e.g., if a number of data points that have intersecting radii between one another satisfies a number threshold). In other words, the clustering system may determine if a distance between two data points satisfies the distance parameter. The distance may satisfy the distance parameter if the distance is less than a value of the distance parameter, if the distance is equal to the value of the distance parameter, and/or if a first radius (defined by a first value of the distance parameter) of a first data point at least partially intersects with a second radius (defined by a second value of the distance parameter) of a second data point, among other examples. In some examples, the first value and the second value may be the same value, but the first value is specific to the first data point and the second value is specific to the second data point.

As described elsewhere herein, different data points and/or different clusters within the data set may use different distance parameters (e.g., different values for the distance parameter) for clustering analysis. For example, as shown by reference number 106, the clustering system may create or form a first cluster. As shown in FIG. 1A, the data points in the first cluster may each be associated with a value of the distance parameter (e.g., which may be different among the data points in the first cluster). In other words, the clustering system, when analyzing data points associated with the first cluster, may use values of the distance parameter (e.g., to define a radius around the data points associated with the first cluster). For example, if a new data point is added to the data set or data space (e.g., via the data stream) and the new data point is located within the data space such that a radius of the new data point and a radius of any data point included in the first cluster at least partially intersect, then the clustering system may determine that the new data point should be added to the first cluster.

As shown by reference number 108, the clustering system may create or form a second cluster. For example, the clustering system, when analyzing data points associated with the second cluster, may use values of the distance parameter that are specific for each data point in the second cluster (e.g., to define a radius around the data points associated with the second cluster). Similarly, as shown by reference number 110, the clustering system may create or form a third cluster in a similar manner as described elsewhere herein. For example, as shown in FIG. 1A, clusters may be formed that do not have circular or regular shapes (as shown by the third cluster) because the clustering system uses a density-based clustering scheme.

The clustering system may determine the values of the distance parameter based on determining when data points are incorrectly clustered. For example, at a starting time (e.g., when a first data point arrives, in time, via the data stream) the clustering system may use a single value of the distance parameter for all data points. However, over time (e.g., as new data points arrive via the data stream), the clustering system may determine that one or more clusters or data points are incorrectly clustered. For example, the clustering system may determine that a cluster is formed that includes a data point that should not be included in the cluster. As another example, the clustering system may determine that a data point included in the data space is not included in a cluster when the data point should have been included in the cluster. The clustering system may dynamically adjust or modify values of the distance parameter associated with data points that are incorrectly clustered (e.g., as described in more detail elsewhere herein). Therefore, over time, the clustering system may associate different clusters and/or different data points with different values of the distance parameter used for the density-based clustering analysis.

In some implementations, the clustering system may determine (e.g., autonomously) when one or more data points are incorrectly clustered (e.g., when a data point and/or cluster are associated with an error). For example, the clustering system may use a machine learning model to determine if a data point is correctly clustered. The machine learning model may be trained using historical clustering data (e.g., from past data streams and/or from different data streams). For example, the historical clustering data may include a set of clusters (e.g., data points arranged in a data space). The historical clustering data may include examples of clusters and/or data points that have been correctly clustered. Additionally, or alternatively, the historical clustering data may include examples of clusters and/or data points that have been incorrectly clustered. Therefore, the machine learning model may be trained to identify when a cluster or data point is incorrectly clustered. If the machine learning model identifies that a cluster and/or data point is incorrectly clustered, then the clustering system may dynamically adjust or modify values of the distance parameter associated with the cluster and/or the data point(s). Additionally, or alternatively, the clustering system may receive user feedback that indicates that one or more clusters and/or data points are incorrectly clustered (e.g., as described in more detail elsewhere herein). If the user feedback indicates that a cluster and/or data point is incorrectly clustered, then the clustering system may dynamically adjust or modify values of the distance parameter associated with the cluster and/or the data point(s).

The clustering system may identify that data points should be clustered together based on a distance (e.g., a Euclidean distance) between the data points within the data space. For example, as shown by reference number 112, the clustering system may identify that a distance between two data points satisfies values of the distance parameter. For example, when comparing two data points, the clustering system may determine if a first radius of a first data point (e.g., the first radius defined by a value of the distance parameter associated with the first data point) intersects with a second radius of a second data point (e.g., the second radius defined by a value of the distance parameter associated with the second data point). Therefore, the clustering system may determine that the two data points should be included in, or added, to the first cluster. For example, analyzing the set of data points may include comparing a first data point and a second data point from the set of data points. The clustering system may compare a location or a position of the first data point to a location or a position of the second data point within the data space. The clustering system may determine if a distance between the first data point and the second data point, in the data space, satisfies a distance parameter. For example, the first data point may be included (e.g., previously) in the first cluster. The second data point may be a new data point added to the data space (e.g., via the data stream). The clustering system may determine if a radius of first data point intersects with a radius of the second data point. In some implementations, a value of the distance parameter (e.g., that is specific to the first data point) may define a radius around the first data point. The clustering system may determine if the location of the second data point is within the radius associated with the first data point. Alternatively, the clustering system may determine if a radius associated with the second data point (e.g., that may be defined by a value of the distance parameter that is specific to the second data point) intersects with the radius associated with the first data point.

The clustering system may correlate the first data point and the second data point in the first cluster if the distance between the first data point and the second data point satisfies the value(s) of the distance parameter (e.g., as described above). For example, the clustering system may add the first data point and/or the second data point to the first cluster. As described elsewhere herein, the value(s) of the distance parameter used by the clustering system for the clustering analysis may be specific to at least one of the first data point, the second data point, and/or the first cluster. Additionally, the clustering system may perform clustering analysis for the set of data points using different values of the distance parameter for different clusters and/or for different data points. For example, the clustering system may perform clustering analysis for data points associated with the second cluster in a similar manner as described above, but using values of the distance parameter that are associated with data points included in the second cluster.

For example, the clustering system may receive, via the data stream, a new data point arranged in the data space. The clustering system may identify a closest data point to the new data point in the data space. The clustering system may determine if a first radius (e.g., defined by a value of the distance parameter associated with the new data point) intersects with a second radius (e.g., defined by a value of the distance parameter associated with the closest data point). The clustering system may add the new data point to the cluster associated with the closest data point if the first radius and the second radius at least partially intersect or overlap.

If the clustering system determines that the first radius of the new data point and second radius of the closest data point do not overlap, then the clustering system may identify the new data point as noise. For example, as shown by reference number 114, certain data points within the data space may not belong to any cluster. Data points that do not belong to, or are not associated with, a cluster may be referred to as noise. The clustering system may identify data points that are associated with noise based on a distance between the data point and a closest data point, within the data space, not satisfying a distance parameter that is specific to the data point, the closest data point, and/or a cluster associated with the closest data point. In some implementations, the clustering system may identify data points that are associated with noise based on a number of data points located near the data point not satisfying a threshold number. For example, as shown in FIG. 1A, two data points may be located near one another within the data space. However, the clustering system may not form a cluster unless a number of data points located near one another satisfies the threshold number. For example, if the threshold number is 5, the clustering system may only form clusters if there are 5 data points that are considered near one another (e.g., based on distances between the 5 data points satisfying a distance parameter, as described elsewhere herein). Therefore, even if radii of the two data points intersect, the two data points may still be considered noise by the clustering system if there are no other data points near the two data points within the data space.

Figure 1B:
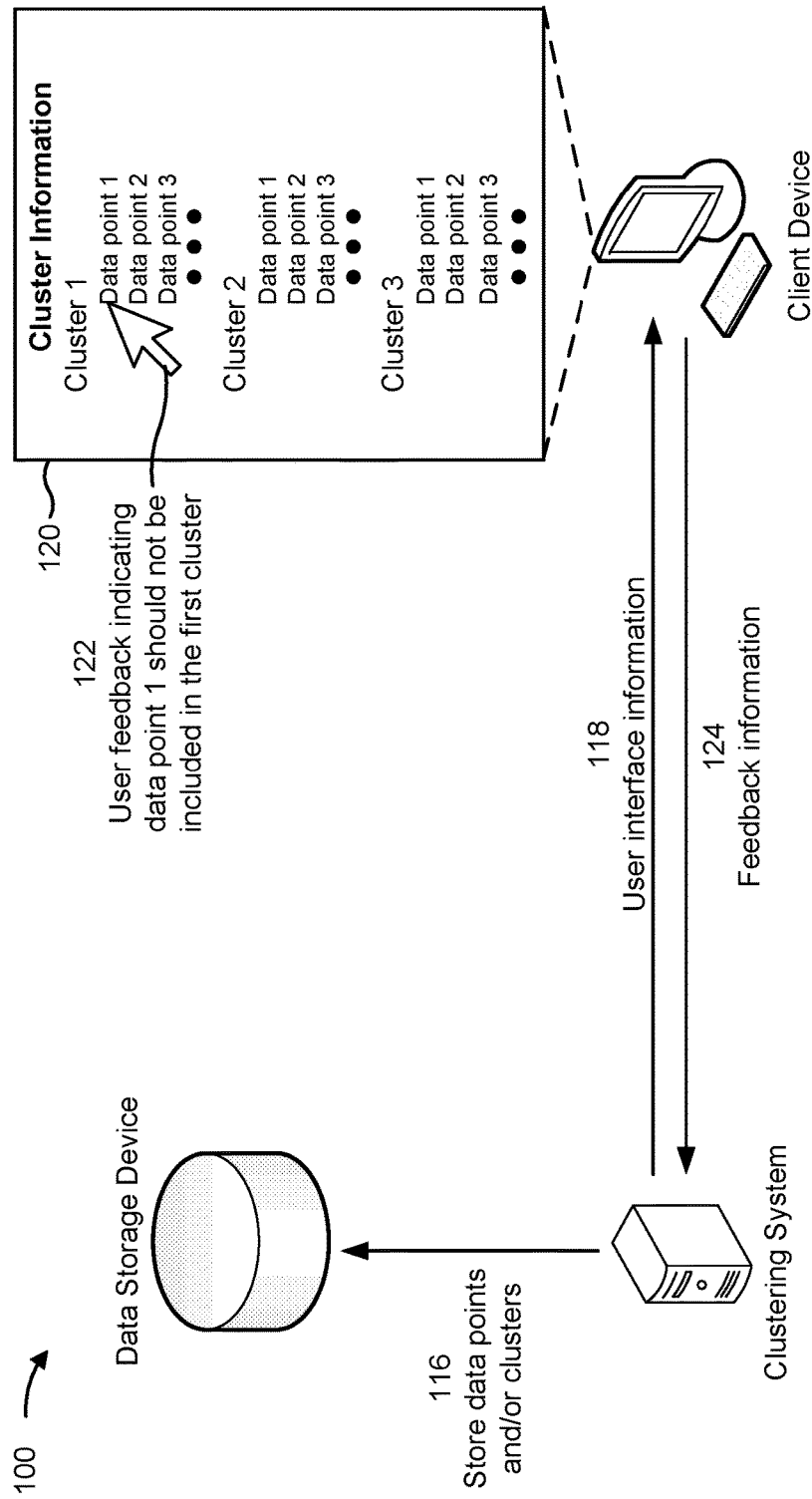

As shown in FIG. 1B, and by reference number 116, the clustering system may store, in the data storage device (e.g., in a data store) the set of data points and one or more clusters after analyzing the set of data points. For example, the clustering system may analyze the set of data points (e.g., as new data points are added to the data set via the data stream). The clustering system may create, form, and/or update one or more clusters based on analyzing the set of data points. The clustering system may store, in the data storage device, the set of data points included in the data space and the clusters formed, created, and/or updated by the clustering system. In some implementations, the clustering system may store the set of data points and one or more clusters periodically (e.g., hourly, semi-daily, daily, and/or weekly). In some implementations, the clustering system may store the set of data points and one or more clusters based on a triggering event, such as a threshold number of new data points being added to the data set, a new cluster being formed, a cluster being modified, and/or a threshold number of clusters being modified, among other examples. Storing the set of data points and one or more clusters may ensure that the clustering system and/or another device can access the set of data points and one or more clusters (e.g., in the event of a catastrophic failure associated with the clustering system, such as a failure of the memory of the clustering system). This may improve the reliability of the clustering analysis. Additionally, this may enable another device to access the set of data points and one or more clusters (e.g., to perform additional analysis and/or to use the set of data points and one or more clusters as historical clustering data, among other examples).

As shown by reference number 118, the clustering system may transmit, and the client device may receive, an indication of the one or more clusters formed by the clustering system from the data set. For example, the clustering system may transmit an indication of one or more clusters and data points included in each cluster. Additionally, the clustering system may transmit an indication of data points that are not included in any clusters (e.g., data points identified as noise). Transmitting the indication of the one or more clusters may cause information associated with the one or more clusters and/or the data set to be displayed by the client device (e.g., via a user interface of the client device). For example, the clustering system may generate user interface information. The user interface information may be configured to cause information associated with the one or more clusters and/or the data set to be displayed by the client device.

In some implementations, the clustering system may transmit the indication of the one or more clusters to a cluster application programming interface (API) associated with the clustering system and/or the client device. In some implementations, the cluster API may generate the user interface information from the information provided by the clustering system. The cluster API may transmit, to the client device, the user interface information to cause information associated with the one or more clusters and/or the data set to be displayed by the client device.

In some implementations, the clustering system may periodically transmit the indication of the one or more clusters and/or the data set to the client device and/or the cluster API. Additionally, or alternatively, the clustering system may periodically transmit the indication of the one or more clusters and/or the data set to the client device and/or the cluster API based on receiving a request for information associated with the one or more clusters and/or the data set. For example, the client device may transmit, to the cluster API and/or the clustering system, a request for information associated with the one or more clusters and/or the data set. In some implementations, the clustering system may transmit the indication of the one or more clusters and/or the data set to the client device and/or the cluster API based on the request transmitted by the client device. In some implementations, the cluster API may trigger the clustering system to provide the indication of the one or more clusters and/or the data set to the client device and/or the cluster API based on the request transmitted by the client device.

As shown by reference number 120, the client device may cause information associated with the one or more clusters and/or the data set to be displayed by the client device (e.g., via a user interface). For example, as shown in FIG. 1B, the client device may display cluster information. The cluster information may identify clusters formed by the clustering system, as described elsewhere herein. For example, the cluster information may identify a cluster (e.g., cluster 1) and may identify data points included in, or associated with, the cluster (e.g., data point 1, data point 2, data point 3, and so on). In some implementations, the cluster information may include descriptive information associated with the clusters, such as a characteristic or parameter that is the same or similar among the data points included in, or associated with, the cluster. Additionally, the cluster information may include an indication of data points that are not included in any clusters (e.g., data points in the data set that have been identified as noise by the clustering system). Displaying the cluster information may enable a user to analyze the clustering performed by the clustering system to identify one or more data points and/or one or more clusters that have been incorrectly clustered (e.g., to identify a cluster and/or a data point associated with an error).

The user may provide an input to the client device (e.g., via the user interface and/or other input mechanisms to the client device, such as a computer mouse click, among other examples) indicating that a cluster or a data point has been incorrectly clustered. For example, as shown by reference number 122, the client device may receive user feedback indicating that a first data point (e.g., data point 1) should not be included in a first cluster (e.g., cluster 1). As another example, the user feedback may indicate that a data point that is not included in a cluster (e.g., a data point identified as noise or a data point included in another cluster) should be included in the cluster. In some implementations, the user feedback may indicate that two clusters formed by the clustering system should be related to one another (e.g., and formed as one cluster).

As shown by reference number 124, the client device may transmit, and the clustering system may receive, feedback information. The feedback information may indicate that a cluster and/or a data point were not correctly clustered by the clustering system. The feedback information may be associated with the one or more clusters, at least one data point, and/or the data set analyzed by the clustering system. In some implementations, the client device may transmit the feedback information to the cluster API. The cluster API may receive the feedback information and may transmit the feedback information to the clustering system. The feedback information may cause the clustering system to perform re-clustering of one or more clusters and/or data points. For example, the feedback information may cause the clustering system to adjust data points included in a given cluster and/or to adjust one or more values of the distance parameter used by the clustering system for clustering analysis.

As shown in FIG. 1C, the clustering system may receive the feedback information and may perform one or more actions in response to receiving the feedback information. The one or more actions may include modifying a value of the distance parameter used for a given cluster and/or data point, adding a data point to a cluster, removing a data point from a cluster, joining two or more clusters into a single cluster, and/or linking two or more clusters together, among other examples. As described elsewhere herein, the clustering system may perform the one or more actions based on determinations made by the clustering system (e.g., in addition to the feedback information, without receiving the feedback information, and/or based on the feedback information).

For example, as shown by reference number 126, the clustering system may determine a modification to a value of distance parameter associated with the first data point (e.g., based on the feedback information indicating that the first data point should not be included in the first cluster) and/or values of the distance parameter for data points located proximate to the first data point. The clustering system may modify the value of the distance parameter associated with the first data point, based on the feedback information, to a modified value of the distance parameter. For example, if the feedback information indicates that the first cluster includes a data point that should not be included in the first cluster (e.g., as described above), then the clustering system may decrease the value of the distance parameter associated with the first data point to obtain the modified value of the distance parameter. In some implementations, as shown by reference number 128, the clustering system may decrease the value associated with the distance parameter such that a distance between the first data point and the closest data point (e.g., to the first data point associated with the first cluster) does not cause radii of the first data point and the closest data point to intersect. In some implementations, the clustering system may determine a distance between the first data point and the closest data point. The clustering system may define a radius (e.g., associated with the value of the distance parameter) for the first data point and the closest data point to be half of the distance (e.g., the distance divided by 2), such that the radii of the first data point and the closest data point touch, but do not cross or intersect. In this way, the clustering system may ensure that the first data point is no longer included in, or associated with, the first cluster (e.g., as shown in FIG. 1C).

As another example, if the feedback information indicates that the first cluster does not include a data point that should be included in the first cluster, then the clustering system may increase a value associated with the distance parameter associated with the data point to obtain the modified value of the distance parameter. For example, the clustering system may determine a distance between the first data point and the closest data point (e.g., to the first data point associated with the first cluster). The clustering system may increase a value of the distance parameter associated with the first data point and/or the closest data point such that a radius of the first data point and a radius of the closest data point at least partially intersect. In some implementations, the clustering system may increase a value of the distance parameter associated with the closest data point and/or the first cluster such that a position of the first data point is included within a radius of the closest data point.

In some implementations, the feedback information may indicate that two (or more) clusters are associated with one another (e.g., should be considered to be one cluster) or that a data point included in a first cluster should also be included in a second cluster. In some implementations, the clustering system may determine a closest distance between a data point in a first cluster and a data point in a second cluster. The clustering system may increase a value of a distance parameter associated with the first cluster, the second cluster, the data point in the first cluster, and/or the data point in the second cluster. For example, the value(s) of the distance parameter may be modified such that radii of the data point in the first cluster and of the data point in the second cluster at least partially intersect (e.g., such that the first cluster and the second cluster may be combined into a single cluster by the clustering system).

In some implementations, when the feedback information indicates that two (or more) clusters are associated with one another (e.g., should be considered to be one cluster), the clustering system may be unable to modify distance parameter(s) to cause the two (or more) clusters to be combined into a single cluster. For example, as shown in FIG. 1C, the feedback information may indicate that the first cluster and the second cluster are associated with one another. However, as shown in FIG. 1C, the first data point (e.g., that the feedback information indicated should not be included in the first cluster) may be located, positionally within the data space, between the first cluster and the second cluster. In other words, if the clustering system were to increase value(s) of the distance parameter (e.g., associated with a data point in the first cluster) and/or increase another value of the distance parameter (e.g., associated with a data point included in the second cluster), then the first data point may be incorrectly clustered with the first cluster and/or the second cluster. As another example, another cluster (rather than a data point) may be located, positionally within the data space, between the first cluster and the second cluster. In such examples, rather than modifying the value(s) of the distance parameter, the clustering system may link the first cluster with the second cluster. For example, the clustering system may link or associate the first cluster and the second cluster (e.g., in a memory of the clustering system and/or in a database) such that the first cluster and the second cluster are associated with one another (e.g., when reported to the client device). For example, new data points may be added, via the data stream, to the first cluster (e.g., using the first (modified) value(s) of the distance parameter associated with data points included in the first cluster for the clustering analysis) and/or new data points may be added, via the data stream, to the second cluster (e.g., using the value(s) of the distance parameter associated with data points included in the second cluster for the clustering analysis). However, the clustering system may treat the first cluster and the second cluster as a single cluster (based on linking the first cluster and the second cluster together) when providing information associated with clusters and/or the data set (e.g., to the client device and/or the cluster API).

Figure 1D:
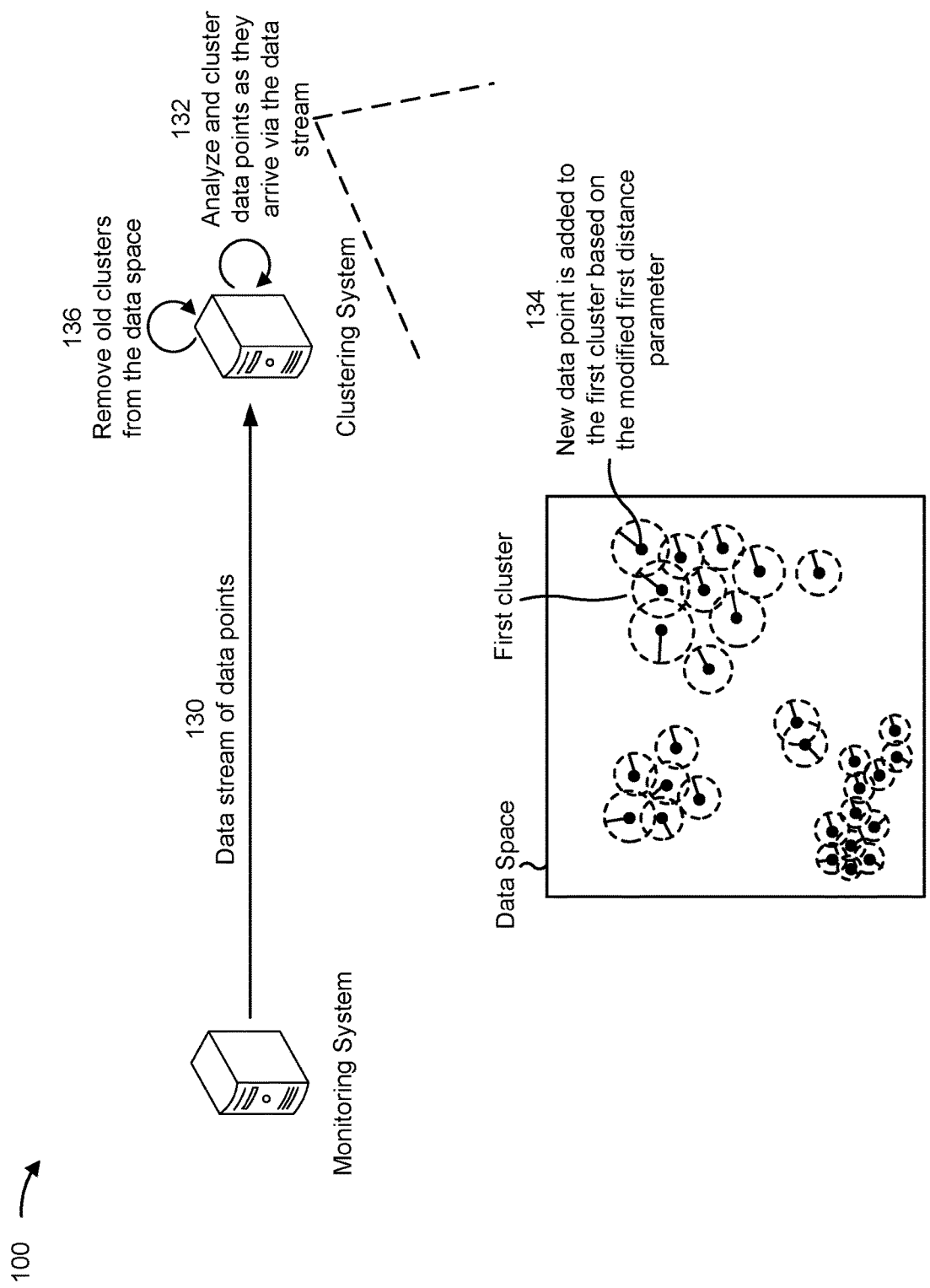

As shown in FIG. 1D, the clustering system may continue to cluster new data points as they arrive via the data stream (e.g., using one or more modified values of the distance parameter as described above). For example, as shown by reference number 130, the monitoring system may recurrently add new data points to the data stream. The clustering system may receive, via the data stream, a new data point (e.g., arranged spatially in the data space). As shown by reference number 132, the clustering system may analyze the new data point, from the data stream, to determine if the new data point should be included in a cluster. For example, the clustering system may analyze the new data point to determine if the new data point should be included in the first cluster using a modified value of the distance parameter for a data point included in the first cluster (e.g., modified as described in more detail elsewhere herein). For example, as shown by reference number 134, a radius of the new data point (e.g., defined by a value of the distance parameter associated with the new data point) and a radius of one or more data points in the first cluster may at least partially intersect. Therefore, the clustering system may add the new data point to the first cluster.

The clustering system may continue to perform one or more (or all) of the actions described herein in connection with clustering analysis. For example, the clustering system may continue to analyze new data points as they arrive via the data stream to determine if the new data points should be added to a cluster and/or to determine if a new cluster should be formed. The clustering system may continue to determine if any clusters and/or data points are incorrectly clustered (e.g., based on determinations by the clustering system and/or based on user feedback). The clustering system may dynamically adapt and/or modify values for distance parameter for different data points used by the clustering system over time based on determining that clusters and/or data points are incorrectly clustered. In this way, the clustering system may be enabled to adapt to varying densities of clusters that may change over time due to newly arriving data points from the data stream. For example, the clustering system may be enabled to use different values for distance parameter for different clusters and/or for different data points. Moreover, the clustering system may be enabled to adapt and/or modify the values for distance parameter for different clusters and/or different data points without requiring an updated configuration (e.g., set by a user) for the clustering analysis. This may improve an accuracy and an efficiency of the clustering analysis.

In some implementations, as shown by reference number 136, the clustering system may remove old clusters from the data space and/or the data set. For example, the clustering system may identify an amount of time since a data point has been added to a cluster. The clustering system may determine if the amount of time satisfies a time threshold (e.g., which may be set via a configuration received from the client device or another device). The clustering system may remove the cluster from the data space and/or the data set if the amount of time satisfies the time threshold. Removing the third cluster from the data space may include clearing the cluster and/or any data points associated with the cluster from one or more memories of the clustering system. In some implementations, the clustering system may determine an amount of time since a cluster was originally formed. If the amount of time since the cluster was originally formed satisfies a time threshold, then the clustering system may remove the cluster from the data space and/or the data set. As another example, the clustering system may determine an amount of time since a data point was added to the data set and/or the data space. If the amount of time since the data point was added satisfies a time threshold, then the clustering system may remove the cluster from the data space and/or the data set. In this way, the clustering system may ensure that old data does not impact the clustering analysis of new data. Because the data set may be continually evolving with newly arriving data points, older data points may be less relevant to clustering analysis than newer data points. For example, if a cluster has not had a data point added to the cluster in some time (e.g., indicated by the time threshold), then this may indicate that the cluster is no longer relevant for the data set and/or the data stream. Therefore, to improve the accuracy of the clustering analysis, the clustering system may remove the old clusters and/or the old data points, in a similar manner as described above.

In some implementations, the clustering system may store (e.g., in a data store and/or the data storage device) a removed cluster and/or any data points associated with the cluster, based on removing the cluster from the data space. Similarly, the clustering system may store (e.g., in a data store and/or the data storage device) a removed data point. This enables the removed cluster(s) and/or removed data point(s) to be accessed by the clustering system and/or another device (such as the client device). Moreover, this enables the clustering system to conserve memory resources that would have otherwise been used to store the removed cluster(s) and/or removed data point(s) in a memory of the clustering system. For example, as new data points may recurrently arrive via the data stream, a size of the data set may increase over time. Therefore, analyzing data associated with a data stream may be associated with a large memory overhead. To reduce this memory overhead, the clustering system may remove cluster(s) and/or data points (s) and store the removed cluster(s) and/or data point(s) (e.g., as described above).

As indicated above, FIGS. 1A-1D are provided as an example. Other examples may differ from what is described with regard to FIGS. 1A-1D.

Figure 2:
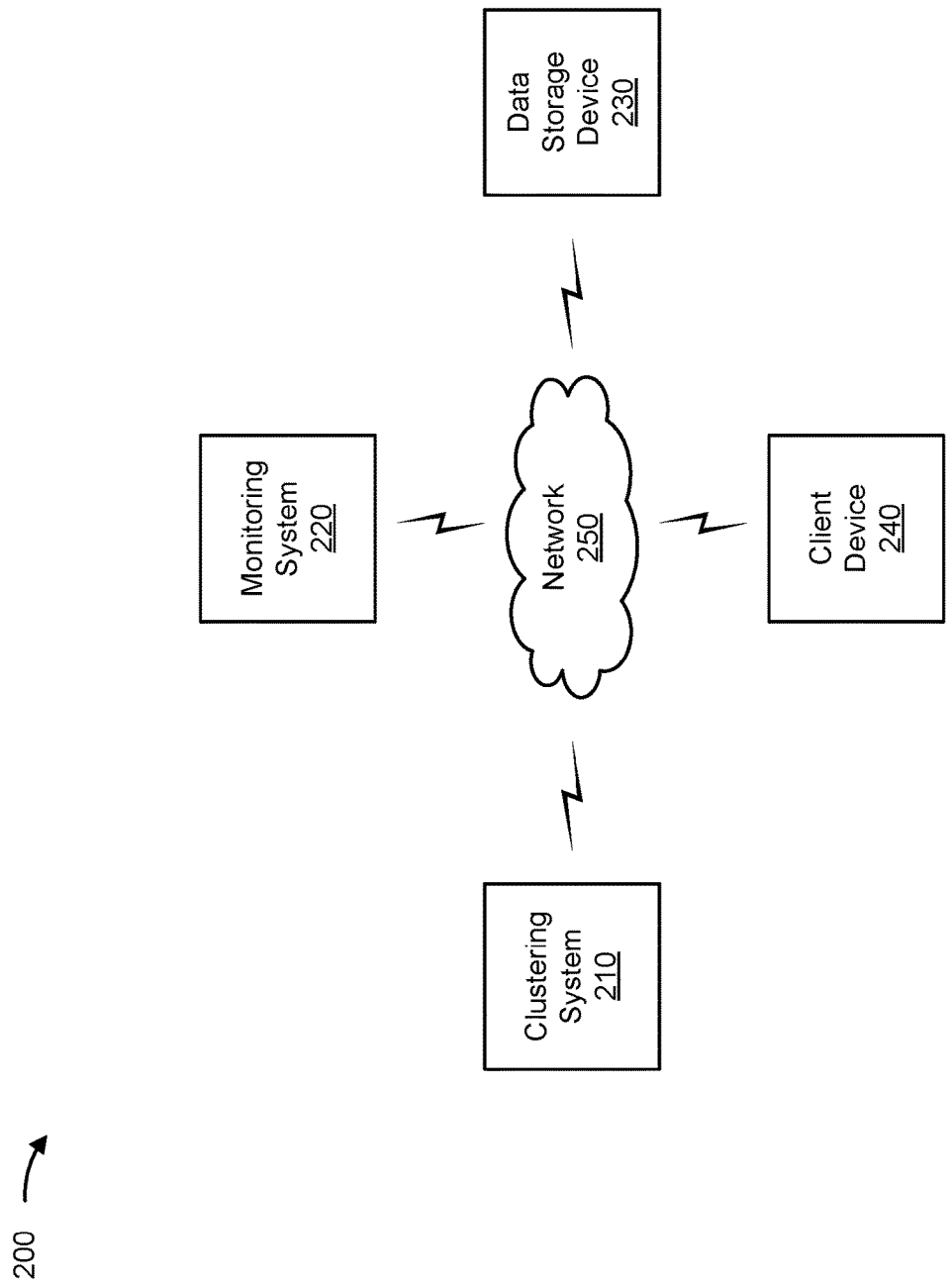
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a clustering system 210, a monitoring system 220, a data storage device 230, a client device 240, and a network 250. Devices of environment 200 may interconnect via wired connections, wireless connections, or a combination of wired and wireless connections.

The clustering system 210 includes one or more devices capable of receiving, generating, storing, processing, providing, and/or routing information associated with variable density-based clustering on data streams, as described elsewhere herein. For example, the clustering system 210 may include one or more devices capable of performing density-based clustering of clusters having varying sizes, while incorporating user feedback into the clustering process, as described elsewhere herein. The clustering system 210 may include a communication device and/or a computing device. For example, the clustering system 210 may include a server, such as an application server, a client server, a web server, a database server, a host server, a proxy server, a virtual server (e.g., executing on computing hardware), or a server in a cloud computing system. In some implementations, the clustering system 210 includes computing hardware used in a cloud computing environment.

The monitoring system 220 includes one or more devices capable of receiving, generating, storing, processing, providing, and/or routing information associated with variable density-based clustering on data streams, as described elsewhere herein. The monitoring system 220 may include a communication device and/or a computing device. For example, the monitoring system 220 may include a server, such as an application server, a client server, a web server, a database server, a host server, a proxy server, a virtual server (e.g., executing on computing hardware), or a server in a cloud computing system. In some implementations, the monitoring system 220 includes computing hardware used in a cloud computing environment.

The data storage device 230 includes one or more devices capable of receiving, generating, storing, processing, and/or providing information associated with variable density-based clustering on data streams, as described elsewhere herein. The data storage device 230 may include a communication device and/or a computing device. For example, the data storage device 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data storage device 230 may communicate with one or more other devices of environment 200, as described elsewhere herein.

The client device 240 includes one or more devices capable of receiving, generating, storing, processing, and/or providing information associated with variable density-based clustering on data streams, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
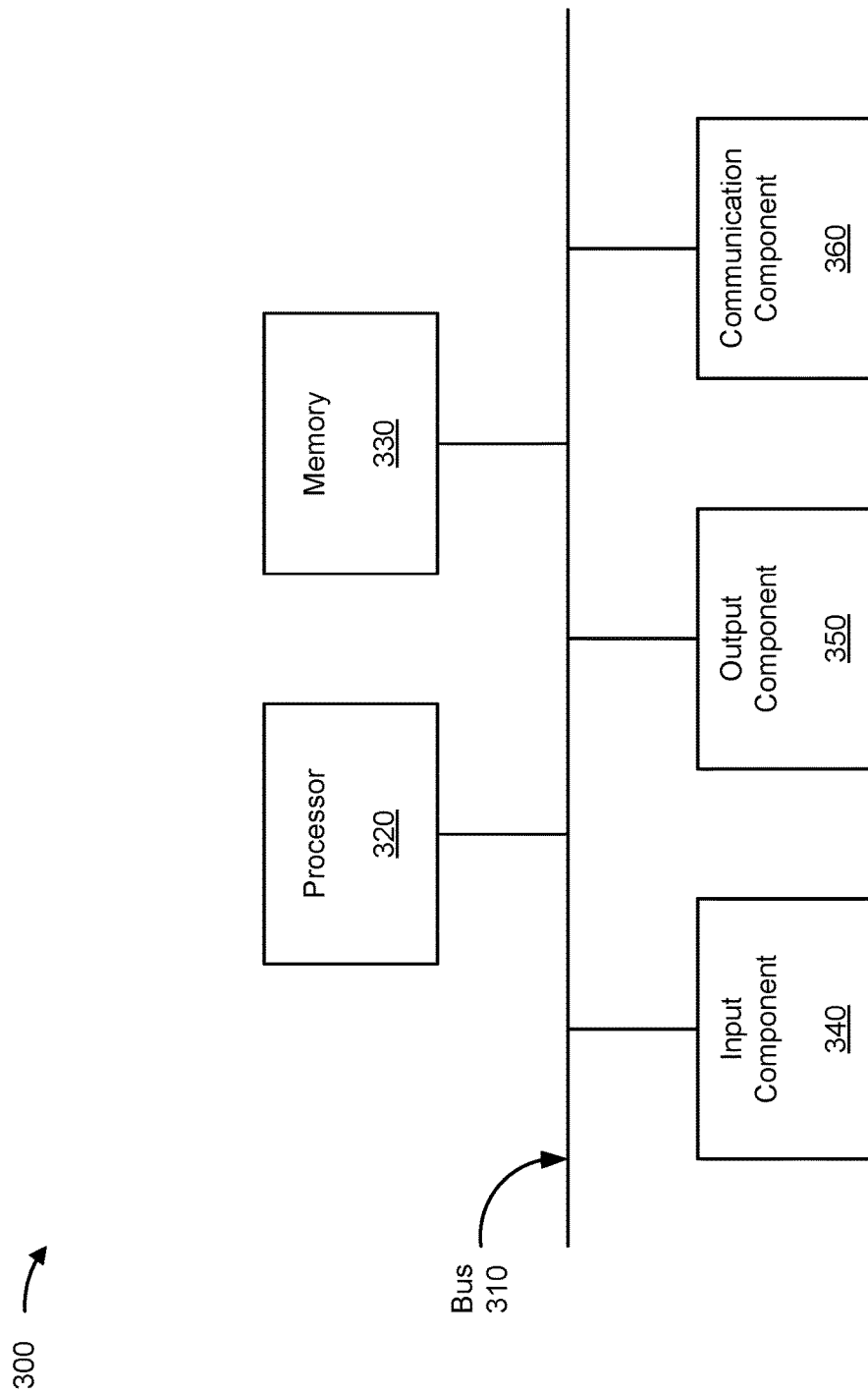
FIG. 3 is a diagram of example components of one or more devices of FIG. 2.

FIG. 3 is a diagram of example components of a device 300, which may correspond to the clustering system 210, the monitoring system 220, the data storage device 230, and/or the client device 240. In some implementations, the clustering system 210, the monitoring system 220, the data storage device 230, and/or the client device 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with variable density-based clustering on data streams. In some implementations, one or more process blocks of FIG. 4 may be performed by a system (e.g., the clustering system 210). In some implementations, one or more process blocks of FIG. 4 may be performed by another device or a group of devices separate from or including the system, such as the monitoring system 220, the data storage device 230, and/or the client device 240. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a data stream, a set of data points arranged in a dimensional data space (block 410). As further shown in FIG. 4, process 400 may include comparing the set of data points to identify one or more clusters using values of a distance parameter for data points included in the set of data points (block 420). In some implementations, the values of distance parameter includes different values of the distance parameter for different data points. In some implementations, comparing the set of data points includes comparing a first data point and a second data point from the set of data points using a first value of the data point associated with the first data point and a second value of the data point associated with the second data point. As further shown in FIG. 4, process 400 may include transmitting, to a client device, an indication of the one or more clusters to cause the client device to display information associated with the one or more clusters (block 430). As further shown in FIG. 4, process 400 may include receiving, from the client device, feedback information associated with at least one data point (block 440). In some implementations, the feedback information indicates that the at least one data point is associated with an error. As further shown in FIG. 4, process 400 may include modifying a value of distance parameter associated with the at least one data point to a modified value of the distance parameter, based on the feedback information (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like. Similarly, satisfying a parameter may, depending on the context, refer to a value being greater than a value of the parameter, greater than or equal to the value of the parameter, less than the value of the parameter, less than or equal to the value of the parameter, equal to the value of the parameter, not equal to the value of the parameter, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for variable density-based clustering, comprising:
   generating, by a device, an updated set of clusters based on:
      removing a subset of clusters of a set of clusters based on determining whether an amount of time of a cluster, of the subset of clusters, since the cluster was formed or added satisfies a threshold value;
   identifying, by the device, one or more clusters of the updated set of clusters using a set of data points arranged in a dimensional data space;
   determining, by the device, if a first radius of a new data point, arranged in the dimensional data space, and a second radius associated with a closest data point to the new data point, in the dimensional data space, intersect,
      wherein the first radius is defined by a first value of a distance parameter associated with the new data point, and
      wherein the second radius is defined by a second value of the distance parameter associated with the closest data point;
   adding, by the device, the new data point to a first cluster, of the one or more clusters, associated with the closest data point if the first radius and the second radius intersect;
   obtaining, by the device, feedback information associated with at least one data point of the set of data points;
   modifying, by the device and based on the feedback information, a value of the distance parameter associated with the new data point;
   linking, by the device, the first cluster and a second cluster with each other in a memory of a clustering system associated with the first cluster and the second cluster, based on receiving feedback that the first cluster and the second cluster are associated with one another;

providing, by the device and to at least one of a client device or a cluster application programming interface, information related to the first cluster and the second cluster by treating the first cluster and the second cluster as a single cluster based on the linking; and performing, by the device and based on the linking, one or more actions based on the modified value of the distance parameter.

2. The method of claim 1, wherein the feedback information indicates that a cluster, of the one or more clusters, or a data point, of the set of data points, was not correctly clustered.

3. The method of claim 1, wherein the feedback information is obtained by a cluster application programming interface.

4. The method of claim 1, further comprising:
obtaining, via a data stream, the new data point.

5. The method of claim 1, further comprising:
identifying the new data point as noise based on the first radius and the second radius failing to intersect.

6. The method of claim 1, further comprising:
determining whether the new data point is noise based on a number of data points near the data point not satisfying a threshold number.

7. A device, comprising:
one or more memories; and
one or more processors, coupled to the one or more memories, configured to:
generate an updated set of clusters based on:
removing a subset of clusters of a set of clusters based on determining whether an amount of time of a cluster, of the subset of clusters, since the cluster was formed or added satisfies a threshold value;
identify one or more clusters of the updated set of clusters using a set of data points arranged in a dimensional data space;
determine if a first radius of a new data point, arranged in the dimensional data space, and a second radius associated with a closest data point to the new data point, in the dimensional data space, intersect,
wherein the first radius is defined by a first value of a distance parameter associated with the new data point, and
wherein the second radius is defined by a second value of the distance parameter associated with the closest data point;
add the new data point to a first cluster, of the one or more clusters, associated with the closest data point if the first radius and the second radius intersect;
obtain feedback information associated with at least one data point of the set of data points;
modify, based on the feedback information, a value of the distance parameter associated with the new data point;
link the first cluster and a second cluster with each other in a memory of a clustering system associated with the first cluster and the second cluster, based on receiving feedback that the first cluster and the second cluster are associated with one another;
provide, to at least one of a client device or a cluster application programming interface, information related to the first cluster and the second cluster by treating the first cluster and the second cluster as a single cluster based on the linking; and
perform one or more actions based on the modified value of the distance parameter.

8. The device of claim 7, wherein the feedback information indicates that a cluster, of the one or more clusters, or a data point, of the set of data points, was not correctly clustered.

9. The device of claim 7, wherein the feedback information is obtained by a cluster application programming interface.

10. The device of claim 7, wherein the one or more processors are further configured to:
obtain, via a data stream, the new data point.

11. The device of claim 7, wherein the one or more processors are further configured to:
identify the new data point as noise based on the first radius and the second radius failing to intersect.

12. The device of claim 7, wherein the one or more processors are further configured to:
determine whether the new data point is noise based on a number of data points near the data point not satisfying a threshold number.

13. A non-transitory computer-readable medium storing a set of instructions, the set of instructions comprising:
one or more instructions that, when executed by one or more processors of a device, cause the device to:
generate an updated set of clusters based on:
removing a subset of clusters of a set of clusters based on determining whether an amount of time of a cluster, of the subset of clusters, since the cluster was formed or added satisfies a threshold value;
identify one or more clusters of the updated set of clusters using a set of data points arranged in a dimensional data space;
determine if a first radius of a new data point, arranged in the dimensional data space, and a second radius associated with a closest data point to the new data point, in the dimensional data space, intersect,
wherein the first radius is defined by a first value of a distance parameter associated with the new data point, and
wherein the second radius is defined by a second value of the distance parameter associated with the closest data point;
add the new data point to a first cluster, of the one or more clusters, associated with the closest data point if the first radius and the second radius intersect;
obtain feedback information associated with at least one data point of the set of data points;
modify, based on the feedback information, a value of the distance parameter associated with the new data point;
link the first cluster and a second cluster with each other in a memory of a clustering system associated with the first cluster and the second cluster, based on receiving feedback that the first cluster and the second cluster are associated with one another;
provide, to at least one of a client device or a cluster application programming interface, information related to the first cluster and the second cluster by treating the first cluster and the second cluster as a single cluster based on the linking; and
perform one or more actions based on the modified value of the distance parameter.

14. The non-transitory computer-readable medium of claim 13, wherein the feedback information indicates that a cluster, of the one or more clusters, or a data point, of the set of data points, was not correctly clustered.

15. The non-transitory computer-readable medium of claim 13, wherein the feedback information is obtained by a cluster application programming interface.

16. The non-transitory computer-readable medium of claim 13, wherein the one or more instructions further cause the device to:
   obtain, via a data stream, the new data point.

17. The non-transitory computer-readable medium of claim 13, wherein the one or more instructions further cause the device to:
   identify the new data point as noise based on the first radius and the second radius failing to intersect.

18. The method of claim 1, wherein the one or more clusters includes a second cluster and a third cluster, and wherein performing the one or more actions include:
   adding a data point to the second cluster,
   removing a data point from the third cluster,
   joining two or more clusters, of the one or more clusters, into a single cluster, or
   linking two or more clusters, of the one or more clusters together.

19. The device of claim 7, wherein the linking is based on determining a closest distance between a first data point in the first cluster and a second data point in the second cluster.

20. The device of claim 19, wherein a first distance parameter associated with the first cluster and a second distance parameter associated with the second cluster are modified such that a first radii of the first data point and a second radii of the second data point at least partially intersect.

* * * * *